INVENTORS
ALEXANDER KASSER
IVAN MICHAEL KASSER

BY *Anslerky + Thomas*

ATTORNEYS

3,429,771
CELLULOSE DISSOLVING PULP PRODUCED FROM GRAIN PARCHMENT
Alexander Kasser and Ivan Michael Kasser, both of 159 Gates Ave., Montclair, N.J. 07042
Original application Feb. 6, 1964, Ser. No. 342,956, now Patent No. 3,354,141, dated Nov. 21, 1967. Divided and this application Sept. 18, 1967, Ser. No. 668,596
U.S. Cl. 162—82                                  8 Claims
Int. Cl. D21c *3/02, 9/12;* D01b *1/50*

ABSTRACT OF THE DISCLOSURE

A grain parchment such as coffee parchment, is pulped through an acid pretreatment step, a brief digestion step and multistage chlorine bleaching step producing an undegraded pulp suited to the manufacture of regenerated cellulose or cellulose derivatives.

---

The present application is a divisional application of the invention as described in co-pending application Ser. No. 342,956, filed Feb. 6, 1964 and allowed as U.S. Patent No. 3,354,141 under the date Nov. 21, 1967.

This invention relates to the production of quality pulp and pulp products from heretofore unusable, microcelled raw materials. More particularly, the invention relates to a method for utilizing micro-cellular materials such as coffee parchment, rice parchment and corn parchment for the economic production of cellulosic pulp, nitrocellulose, cellulose esters, cellulose ethers and viscose solutions for producing cellophane, rayon fiber, cord and the like.

Materials which have classically been selected for producing quality pulp have been selected on the basis of yield of alpha-cellulose as well as lengths of their fibers. These include seed hairs (cotton), stem fibers (linen, jute), leaf fibers (straw, esparto), fruit fibers (coconut) and wood fibers. A second criterion for raw materials has been the content of lignins and pentosans which, if excessive, raises processing costs and lowers yield, thereby making the use of such materials uneconomic. Additionally, processing of these materials to remove lignins and pentosans results in degradation of the cellulosic chains.

It is a principal feature of the present invention that satisfactory cellulosic products can be produced economically from certain materials which fail on both of the above criteria.

The term "parchment," as applied herein, means the material covering grains of coffee, rice, corn and the like. Coffee parchment, which is a by-product isolated during the process of coffee production, is a material typical of those this invention utilizes. It has been used in fertilizers, mixed in cattle feed, as a substitute for chicory and as a possible ion exchange material, but has not proved more than marginally successful in any of these applications. It can be used as a combustible, but is considered as a nuisance to coffee producers, who often have to burn great collected amounts without recovering the heat of combustion.

Parchment is composed of very short cellular material, averaging less than 500 microns in length, and which is generally called "microcelled" herein. To take an example, the coffee bean parchment is composed mainly of sclerular cells, the average length of which is 380 microns. These materials, having very high lignin and pentosan contents, have never been treated to make useful cellulosic pulps or pulp derivatives.

When parchment cells are isolated they are found to be stiff, straight and highly irregular with protrusions. In contrast, the cells of woody cellulosic material used industrially are at least twice as long, usually more than four to seven times as long, have many bends, are elastic and rarely have irregular protrusions, thus offering a possibility of intertwining and greater interaction between the cells (fibers).

As noted hereinabove, the high percentage of lignin and pentosans in these parchments prevented the preparation of useful cellulosic pulps by known methods, and thus, the industrial exploitation of these materials. The elimination of lignin and pentosans from the micro-cells, the main structural unit of the parchment material, was too complicated without excessive degradation of the cellulose chains, and in any event resulted in a prohibitively low yield on raw material treated.

It is accordingly an object of the present invention to provide an economic process for the treatment of microcelled materials to produce useful cellulosic products.

A further object of the invention is to provide a process for making useful cellulose, nitrocellulose, cellulose ethers and esters and viscose solutions from parchment materials.

A still further object of the invention is to provide an economic use for waste products such as coffee, rice and corn parchment.

These and other objects and advantages will appear from the following description of several embodiments of the invention, and the novel features will be particularly pointed out in connection with the appended claims.

The process of the invention eliminates lignin and pentosans from micro-cellular parchment material without excessive degradation of the cellulose chains, and at the same time an industrially acceptable yield of pulp is maintained. Pulp produced according to the invention can be further treated, by new procedures, to produce a viscose from which rayon cord and fiber and cellophane of unusually good quality can be made.

The process of the invention is the result of an intensive study of the mechanical, physico-chemical and chemical properties of parchment, and a proper understanding of the invention requires some attention to these properties. Understanding will be further aided by referring to the attached drawings, wherein.

Figure 1:
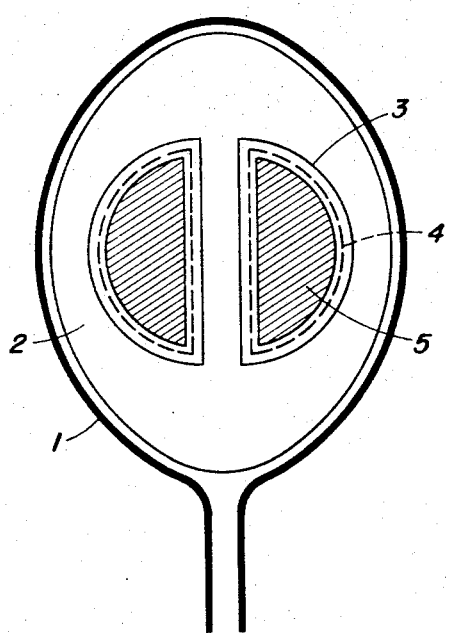
FIGURE 1 is a schematic illustration of the coffee fruit or bean showing the component parts thereof.

With reference to FIGURE 1, it is seen that the coffee fruit includes the exocarp 1, mesocarp 2, parchment 3 (also called endocarp), the silver skin or tegument 4 composed of parenchymatic cells, and the albumen or grain 5.

Figure 2A:
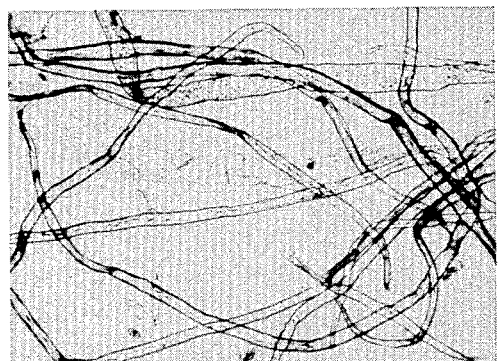
FIGURES 2a and 2b are photomicrographs (125×) showing (a) hard wood cells and (b) coffee parchment cells.
Figure 2B:
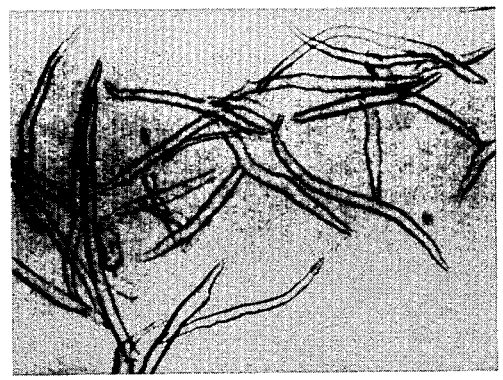
Figure 3:
FIGURE 3 is a photomicrograph (110×) of a coffee parchment in transverse section.

Mechanical properties of parchments which are pertinent include the following: raw parchment has a thickness of from 100 to 300 microns, and is shown in FIGURE 3. Often the silver skin separates with the endocarp upon coffee processing. The cells of both the silver skin and the endocarp are short, stiff and irregular as can be seen in FIGURE 2b.

Figure 4:
FIGURE 4 is a photomicrograph (110×) of the face side of coffee parchment.

The principal physico-chemical property of interest is the very high density of the cells in parchments and prevalent intercrossing of cells, at least when compared to woody or annual plants, as shown in FIGURE 4.

Chemically, the significant properties are the aforementioned large proportions of lignin and pentosans; it is to be noted that an abnormally large fraction of these materials are extremely resistant to the standard chemical elimination treatments, and such treatments tended to degrade the cellulose.

While the process of the invention will vary somewhat depending on the particular characteristics of the material being treated, the process involves three stages: an acid treatment, an alkali treatment and bleaching. In the first stage, an unusually high percentage of sulfuric acid (1–2%) with respect to parchment is employed. The second stage is a short (15–30 minutes) batch treatment with a low percentage (12–18%) of alkali and high sulfidity (30–40%). Bleaching is multistage, usually 5–9 times, with 40 to 65% of chlorine consumed in the form of chlorine dioxide, to penetrate the very dense cell walls. Before the last chlorine dioxide stage, the pulp is purified with concentrated sodium hydroxide solution at about 20° C.

It is believed that a more complete understanding of the invention will be gained by referring to the following specific examples wherein the complete treatment of coffee bean parchment is set forth. It is to be understood that these examples are illustrative only and are not intended in a limiting sense. In particular, those skilled in the art will recognize that minor variations of treatment will be required when the composition of the parchment varies from the illustrated material, or when corn or rice parchment is used.

EXAMPLE I

The coffee bean parchment employed had an average cell length of 380 microns. Pentosan content was 27% and lignin content was 26.3%.

Under conditions where practically all of the noncellulosic carbohydrates are retained, i.e., holocellulose, analysis showed 72.5%. So called Cross and Bevan cellulose, wherein a very small quantity of pentosans as well as noncellulosic hexosans are retained, was 54%.

Processing of this parchment was carried out in three stages; pretreatment, digestion and bleaching, as follows:

A concentration of 1.2% $H_2SO_4$ with respect to raw material was employed in the pretreatment, the liquid-solid ratio being 6:1. This step lasted 1½ hours and temperature was controlled at about 150° C. Washing was then carried out on a 300 mesh filter.

Digestion was performed with 18% alkali and 33% sulfidity, utilizing conventional reagents, with a liquid-solid ratio of 4.5:1 for 30 minutes at 165° C. Again, this was followed by washing on a 300 mesh filter.

Bleaching was carried out in six stages, and the conditions for each stage were as follows:

(a) Chlorine water:
  Concentration _____ 3.0% chlorine with respect to pulp (45% of total chlorine needed).
  Duration _____ 2 hours.
  Temperature _____ Room temperature.
  Consistency _____ 3%.

(b) Sodium hydroxide extraction:
  Concentration _____ 2% NaOH with respect to pulp.
  Duration _____ 60 minutes.
  Temperature _____ 50° C.
  Consistency _____ 5%.

(c) Sodium hypochlorite:
  Concentration _____ 1% hypochlorite (15% of total chlorine needed).
  Duration _____ 2 hours.
  Temperature _____ 38° C.
  Consistency _____ 3%.

(d) Caustic purification:
  Concentration _____ 150% NaOH with respect to pulp.
  Duration _____ 60 minutes.
  Temperature _____ 20° C.
  Consistency _____ 5%.

(e) Chlorine dioxide:
  Concentration _____ 2.8% chlorine dioxide (40% of total chlorine needed).
  Duration _____ 4 hours.
  Temperature _____ 70° C.
  Consistency _____ 5%.

(f) Sulfur dioxide:
  Concentration _____ 1% $SO_2$ with respect to pulp.
  Duration _____ 30 minutes.
  Temperature _____ Room temperature.
  Consistency _____ 3%.

Bleaching was followed by deionized water washing.

The pulp thus obtained had the following analytical properties:

Yield _____ percent__ 33
Alpha cellulose _____ do____ 98
Lignin _____ do____ 0.1
Pentosans _____ do____ 1.8
D.P. _____ 633
Brightness _____ photovolt__ 89
Ash _____ percent__ 0.13

This pulp was then dried in the atmosphere. It was used successfully to prepare carboxymethylcellulose, nitrocellulose and other cellulose derivatives.

EXAMPLE II

The procedures of Example I were repeated, employing (a) corn parchment and (b) rice parchment. In each case the pulp produced was comparable to that of Example I.

Having thus described the subject matter of the invention, what it is desired to secure by Letters Patent is:

1. A process for producing cellulosic pulp from microcelled parchment material that comprises:
  (a) a pretreating step employing 1–2% of sulfuric acid by weight with reference to parchment material;
  (b) a 15–30 minute digestion step employing 12–18% alkali concentration and 30–40% sulfidity;
  (c) multistage chlorine bleaching wherein a 40–65% of said chlorine is supplied as chlorine dioxide; and
  (d) drying the pulp so produced.

2. Process for producing cellulosic pulp from microcelled grain parchment materials yielding a near pure substantially undegraded cellulosic pulp substantially free of lignins and pentosans that comprises:
  (a) a pretreating step employing in solution approximately 1–2 percent sulfuric acid by weight with reference to raw material at a temperature of approximately 150° C.; washing said pulp; filtering said pulp;
  (b) a 15–30 minute digestion step employing in solution approximately 12–18 percent alkali and 30–40 percent sulfidity at a temperature of approximately 165° C.; washing said pulp; filtering said pulp;
  (c) a multistage chlorine bleaching step wherein from 40 to 65% of consumed chlorine is supplied as chlorine dioxide, and including purification with concentrated sodium hydroxide solution prior to the final chlorine dioxide stage; and
  (d) drying the pulp so produced.

3. Process for producing cellulosic pulp from microcelled grain parchment materials yielding a pure substantially undegraded cellulosic pulp substantially free of lignin and pentosans that comprises:
  (a) a pretreating step employing approximately 1–2 percent sulfuric acid by weight with reference to raw material at a temperature of approximately 150° C. and a liquid-solid ratio of about 6:1; washing said pulp; filtering said pulp;
  (b) a 15–30 minute digestion step employing approximately 12–18 percent alkali and 30–40 percent sulfidity at a temperature of about 165° C., and a liquid-solid ratio of 4.5:1; washing said pulp; filtering said pulp;

(c) a multistage chlorine bleaching step comprising successive treatment of the pulp with chlorine water, dilute sodium hydroxide, sodium hypochlorite, concentrated sodium hydroxide approximately 150 percent by weight with respect to pulp, chlorine dioxide, and sulfur dioxide; and (d) drying the pulp so produced.

4. The process as claimed in claim 3, and further comprising washing with deionized water after step (c).

5. A composition of matter comprising the product of the process of claim 2.

6. The process of claim wherein the starting material for cellulosic pulp from micro-grain celled parchment is coffee parchment.

7. The process of claim 2 wherein the starting material for cellulosic pulp from micro-grain celled parchment is corn parchment.

8. The process of claim 2 wherein the starting material for cellulosic pulp from micro-grain celled parchment is rice parchment.

References Cited

UNITED STATES PATENTS

| | | |
|---|---|---|
| 295,835 | 3/1884 | Teter. |
| 1,548,864 | 8/1925 | Brandenberger. |
| 1,570,389 | 1/1926 | Morgenier. |
| 1,989,424 | 1/1935 | Osgood et al. |
| 2,140,863 | 12/1938 | Sunesson. |
| 2,153,316 | 4/1939 | Sherrand et al. |
| 2,156,159 | 4/1939 | Olsen et al. |
| 2,615,883 | 10/1952 | Sweeney et al. |
| 2,924,547 | 2/1960 | Knapp et al. |
| 2,962,413 | 11/1960 | Hatheway. |

OTHER REFERENCES

"Industrial Utilization of the Coffee Plant," Aranjo et al., News edition, Am. Chem, Soc. (Chem. & Eng. News), vol. 19, No. 16, pp. 877–811, Aug. 21, 1941.

HOWARD R. CAINER, *Primary Examiner.*

U.S. Cl. X.R.

162—97, 99